Dec. 8, 1936. F. VON OKOLICSANYI 2,063,643
TELEVISION RECEIVER
Filed July 7, 1932

Patented Dec. 8, 1936

2,063,643

UNITED STATES PATENT OFFICE 2,063,643

TELEVISION RECEIVER

Franz von Okolicsanyi, Nuremberg, Germany

Application July 7, 1932, Serial No. 621,289
In Germany August 5, 1931

1 Claim. (Cl. 178—6)

Television receiving apparatus is known in which a linear source of light, the brightness of which is modulated according to the variations in the photoelectric currents is subjectively observed by means of a mirror screw acting as a picture assembling device without the use of any intermediate optical means. As the mirror screw reproduces the light of the linear source of light in the form of a surface it has the properties of a cylindrical mirror. Its law is analogous to that pertaining to lenses and it reads:

$$\frac{1}{B}+\frac{1}{L}=\frac{4\pi}{bz}$$

wherein B is the observation distance, L the distance of the source of light from the mirror screw, $b$ the width of the mirror and $z$ the number of the lines. The value $$\frac{4\pi}{b.z}$$

is constant and determines the lamp and observation distance for which the picture appears undistorted in the mirror screw. In the case of a 100 line picture and of a mirror width of 10 cms. I obtain a minimum illumination and observation distance of 1.6 mms.

A definite source of light having a definite light intensity thus produces a well defined surface brightness which can be increased only by increasing the intensity of the source of light but not by reducing the distance of the source of light from the mirror screw and the observation distance, as this would cause a distortion of the picture. Moreover, the rays coming from the eye and which are deflected over the uppermost and lowermost mirror surface must impinge on an illuminating part of the source of light. If L is equal to B the linear source of light must be twice as long as the mirror screw is high. As the consumption of the current increases proportionally with the length of the source of light this requirement increases the cost of operation. Moreover, as the observation distance cannot be increased, since the size of the picture and the observation distance are dependent on one another owing to the desired sharpness of the picture, the disadvantages above referred to cannot be removed by reducing the distance of the source of light from the mirror screw.

The present invention consists in using wellknown optical means which are inserted in the path of the rays between the source of light and the mirror screw for avoiding the disadvantages above referred to. By using spherical or cylindrical convex lenses or suitable spherical and cylindrical hollow mirrors the brightness of the picture can be increased. It is possible to obtain the desired result with a smaller length of the source of light. In any case, the lens or the mirror is so arranged that the distance from the source of light is smaller than the focus of the lens or the mirror. I then obtain a formula which is valid for magnifying glasses: magnification $$w=\frac{f}{f-d}$$

wherein $d$ is the distance between the source of light and the lens, and $f$ the focus of the lens. $w$ may represent either a magnification of the picture or a magnification of the brightness of the light falling on the mirror screw.

Figure 1:
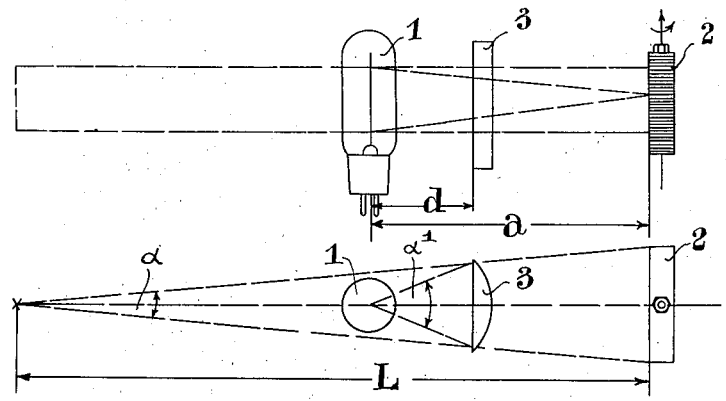
Figure 1 shows a scanning system in which the axis of the cylindrical lens is parallel to the axis of the light source and mirror helix.
Figure 2:
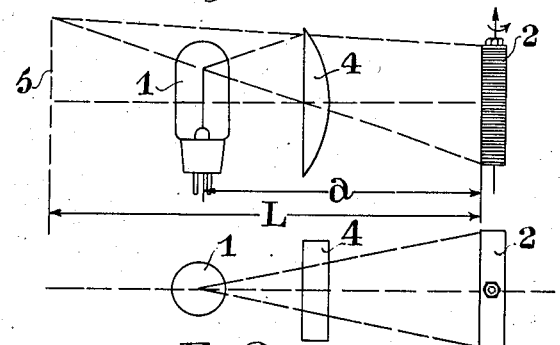
Figure 2 shows a scanning system in which the axis of the cylindrical lens is at right angles to the axis of the light source and mirror.
Figure 3:
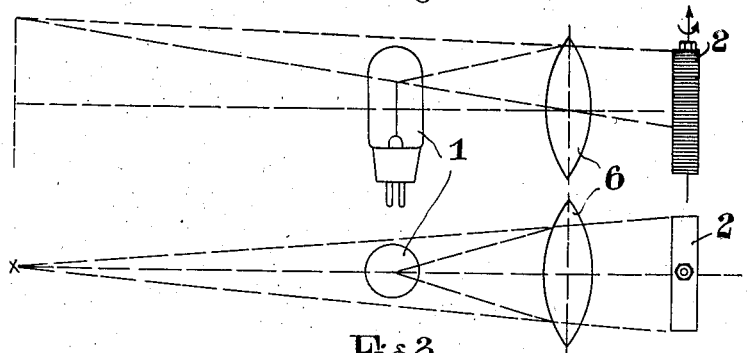
Figure 3 shows a modification of the invention in which a spherical lens is used between the light source and the mirror helix.

The invention will now be illustrated diagrammatically and by way of example with reference to Figures 1 to 3 of the accompanying drawing.

Referring to Fig. 1 a cylindrical lens 3 is provided between the linear source of light 1 and the mirror screw 2 in which all the mirror surfaces are diagrammatically shown to be at right angles to the rays of light, the vertical axis of the cylindrical lens 3 being parallel to the source of light and to the axis of the mirror screw. The distance $d$ is smaller than the focus $f$ of the lens. The real illumination distance is $a$ and the apparent illumination L which corresponds to the distance of the source of light from the mirror screw in the formula above given for the mirror screw. It will be seen from the drawing that the source of light can be displaced towards the mirror screw in the ratio of $$\frac{L}{a}$$

whereby the brightness is increased in the ratio of the angles $$\frac{\alpha'}{\alpha}$$

It is possible to obtain the same favourable effect as with a cylindrical lens by means of a cylindrical mirror if the linear source of light is mounted at a distance $d$ from the mirror which is smaller than the focus $f$ and if the said source projects only a very weak divergent beam of light on the mirror screw. In that case the hollow mirror can be approached very near to the mirror screw but the light which impinges directly from the source of light on the mirror screw must be screened by means of a screen preferably from a second narrow cylindrical mirror. If the source of light is brought into the focus of the cylindrical mirror the illumination distance becomes infinite and the observation distance B can be made equal to the focus $$\frac{b.z}{4\pi}$$

As the beam of rays which comes from the mirror is parallel the size of the mirror must be at least equal to the size of the mirror screw. The width of the spot of light to be seen depends in this case upon the opening of the pupil of the eye and is about 2 to 3 mms.

In Fig. 2 a cylindrical lens 4, the axis of which is at right angles to the source of light and the axis of the mirror screw, is provided between the source of light 1 and the mirror screw 2. The source of light has an apparent distance L from the mirror screw and an apparent length 5. In this lens arrangement use can be made of a correspondingly shorter source of light, whilst the brightness remains approximately the same.

In Fig. 3, 6 is a spherical lens which is provided between the source of light and the mirror screw, whereby both the brightness and the apparent length of the source of light are increased.

Naturally, instead of a spherical lens use may be made of a spherical hollow mirror, in which the source of light is arranged at a distance smaller than or equal to the focus. Also in this case the light which falls directly on the mirror screw must be screened.

What I claim is:—

A television receiving apparatus comprising a linear source of light, a mirror screw for the subjective observation of said source of light, said source of light being of less length than said mirror screw, a cylindrical lens with a focus, said lens being arranged at a distance from the source of light smaller than the focus of the lens whereby the illumination distance is decreased and the brightness of illumination is increased, said lens being arranged with its axis at right angles to the axis of the linear source of light.

FRANZ V. OKOLICSANYI.